(12) United States Patent
Kumbhari (10) Patent No.: US 8,489,834 B1
(45) Date of Patent: Jul. 16, 2013

(54) AUTOMATIC CLASS OF SERVICE PROVISIONING FOR DATA TRANSFER WITHIN A DATA CENTER

(75) Inventor: Uday Kishore Kumbhari, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 412 days.

(21) Appl. No.: 12/960,147

(22) Filed: Dec. 3, 2010

(51) Int. Cl.
*G06F 13/00* (2006.01)

(52) U.S. Cl.
USPC .......................................................... 711/162

(58) Field of Classification Search
None
See application file for complete search history.

(56) References Cited

PUBLICATIONS

Harrington et al., "An Architecture for Describing Simple Network Management Protocol (SNMP) Management Frameworks," RFC 3411, Dec. 2002, 60 pp.

*Primary Examiner* — Duc Doan
(74) *Attorney, Agent, or Firm* — Shumaker & Sieffert, P.A.

(57) ABSTRACT

In general, techniques are described to provide integration between a network management system and a storage management system. A network management system is described in which a programmable processor is configured to receive a message that defines a storage data transfer operation within a storage network controlled by the storage management system, generate configuration data to program one or more managed network devices to service the storage data transfer operation, wherein the one or more managed network devices are connected to comprise a switch fabric, and send the configuration data to the one or more managed network devices to create a network in the switch fabric to service the storage data transfer operation of the storage network.

45 Claims, 6 Drawing Sheets

AUTOMATIC CLASS OF SERVICE PROVISIONING FOR DATA TRANSFER WITHIN A DATA CENTER

TECHNICAL FIELD

The invention relates to computer networks and, more particularly, to techniques for configuring and managing network devices.

BACKGROUND

A data center is a specialized facility that houses web sites and provides data serving and backup as well as other network-based services for subscribers. A data center in its most simple form may consist of a single facility that hosts all of the infrastructure equipment, such as networking and storage systems, redundant power supplies, and environmental controls. More sophisticated data centers are normally organizations spread throughout the world with subscriber support equipment located in various physical hosting facilities.

In a data center, various storage systems are interconnected via high-speed communication equipment. The storage systems are often operated and controlled by a Storage Management System (SMS). The SMS administers data center operations to monitor and configure the storage systems to perform storage operations. For example, the SMS may direct the storage systems to execute storage data transfer operations. One type of storage data transfer operation is a periodic data backup. A periodic data backup is configured to run on a periodic basis and may, for example, back up data from a primary storage system within the data center to a secondary storage system or from a secondary storage system to a tertiary storage system. Another type of data transfer operation is a synchronous data replication operation in which individual data write operations to a primary storage system in a data center are automatically mirrored to a secondary storage system, often in real-time.

SUMMARY

In general, techniques are described to provide automatic class of service provisioning of internal, high-speed data communication equipment that interconnects the data storage systems of a data center. That is, as described herein, switching resources of the internal high-speed switching components of the data center are automatically and potentially dynamically allocated for each data transfer operation within the data center. This automatic class of service provisioning of the internal switching components that interconnect the storage systems of the data center (i.e., the switch fabric of the data center) may increase efficiency and reliability of the data center operation.

The techniques may provide integration and coordination between a Network Management System (NMS) and a Storage Management System (SMS) within the data center to automatically provision the switching components with respect to the individual storage data transfer operations in the data center. For example, the SMS may define messages that direct storage systems to execute storage data transfer operations, such as periodic backups and synchronous backups, to transfer data between storage devices through the switch fabric. Moreover, the SMS may communicate information describing the data transfer operations to the NMS for intelligent and automated provisioning of the network devices within the switch fabric. The NMS may automatically discover the physical topology and switching resources of the switch fabric, which provides visibility of the complete path of data transfer traffic for each storage data transfer operation. In one embodiment, the NMS may automatically configure the specific switching resources of network devices of the switch fabric to provision a logical network in the switch fabric to provide a defined class of service for a given storage data transfer operation. The logical network may specify a Virtual Local Area Network, Class of Service, and set of logical interfaces for the switching devices along the data transfer path. Integrating the NMS and SMS in this way enables the NMS to obtain information specifying the particular storage data transfer operations occurring within the data center. As such, the NMS is able to utilize this information to create and provision switching resources for logical networks through which the data transfers occur during the storage data transfer operation. Based on the type of storage data transfer operation, the NMS may configure the logical network to transfer data quickly and reliably from one storage device to another.

In one example, a method includes, receiving, at a network management system and from a storage management system, a message that defines a storage data transfer operation within a storage network controlled by the storage management system; generating, by the network management system, configuration data to program one or more managed network devices to service the storage data transfer operation, wherein the one or more managed network devices are connected to comprise a switch fabric; and sending, by the network management system, the configuration data to the one or more managed network devices to create a network in the switch fabric to service the storage data transfer operation of the storage network.

In another example, a network management system comprises a programmable processor, wherein the programmable processor is configured to: receive, from a storage management system, a message that defines a storage data transfer operation within a storage network controlled by the storage management system; generate configuration data to program one or more managed network devices to service the storage data transfer operation, wherein the one or more managed network devices are connected to comprise a switch fabric; and send the configuration data to the one or more managed network devices to create a network in the switch fabric to service the storage data transfer operation of the storage network.

In another example, a method includes generating, by a storage management system, a message that defines a storage data transfer operation within a storage network controlled by the storage management system; and sending, by the storage management system, the message that defines the storage data transfer operation to the network management system to generate configuration data to program one or more managed network devices to service the storage data transfer operation.

In another example, a storage management system comprises a programmable processor, wherein the programmable processor is configured to: generate a message that defines a storage data transfer operation within a storage network controlled by the storage management system; and send the message that defines the storage data transfer operation to the network management system to generate configuration data to program one or more managed network devices to service the storage data transfer operation.

In another example, a system comprises a network management system; and a storage management system; wherein the network management system comprises a control unit comprising: a storage data transfer operation module configured to receive, from the storage management system of a data center, a message that defines a storage data transfer operation within a storage network controlled by the storage management system; a device manager configured to generate configuration data to program one or more managed network devices to service the storage data transfer operation, wherein the one or more managed network devices are interconnected to form a switch fabric of the data center; and one or more physical network interfaces to send the configuration data to the one or more managed network devices to create a network in the switch fabric to service the storage data transfer operation of the storage network.

DETAILED DESCRIPTION

Figure 1:
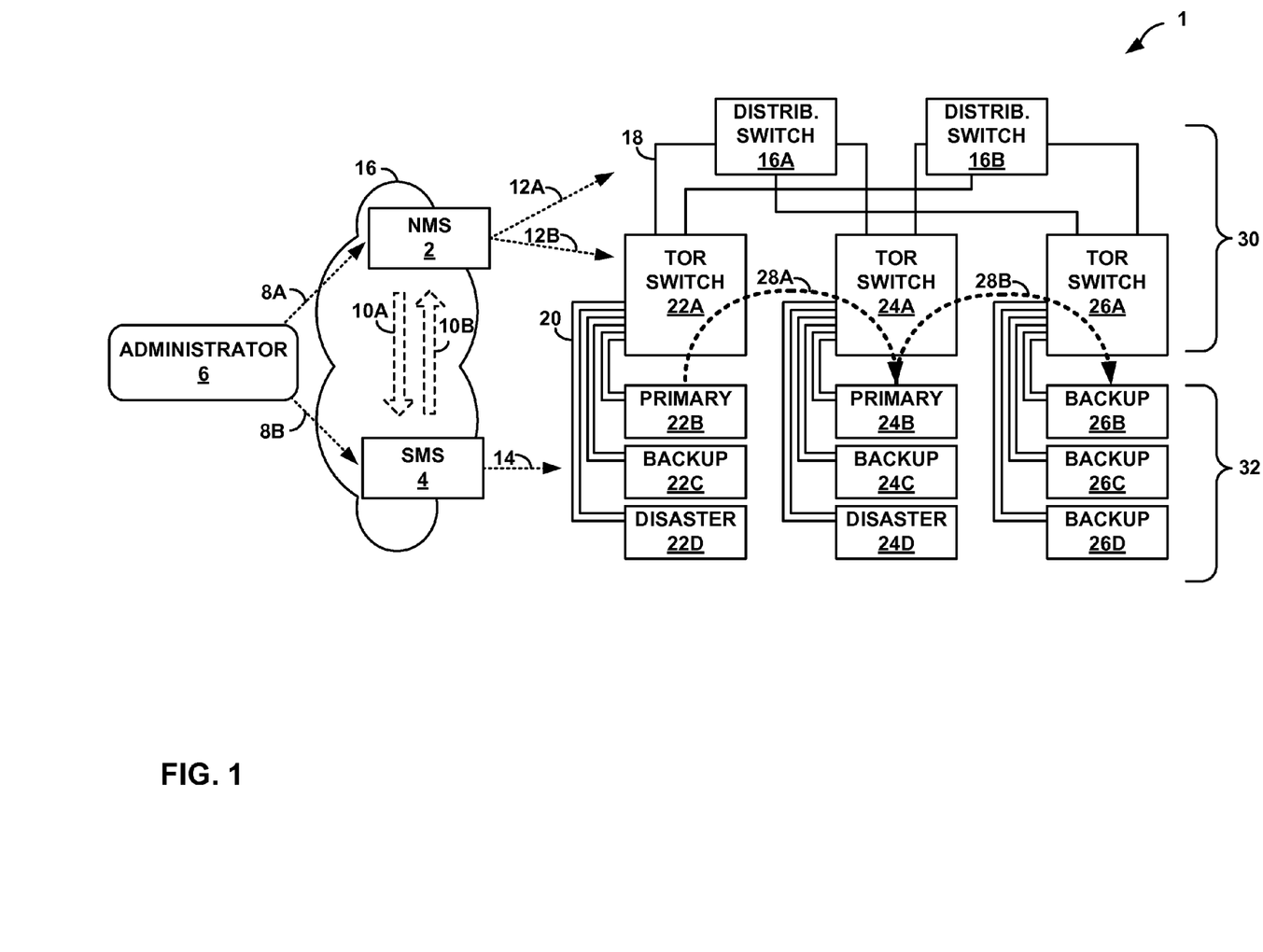
FIG. 1 is a block diagram illustrating an example system that automatically and potentially dynamically provisions switching resources to service storage data transfer operations in a data center in accordance with the techniques of this disclosure.

FIG. 1 is a block diagram illustrating an example system that automatically and potentially dynamically provisions switching resources to service storage data transfer operations in a data center in accordance with the techniques of this disclosure. SMS 4 is a combination of computer hardware and software to monitor and administer a storage network 32 which, in the example, is organized into three distinct racks or areas 22, 24 and 26. Storage racks 22, 24 and 26 includes storage devices 22B-D, 24B-D, 26B-D coupled to top-of-rack (TOR) switches 22A, 24A and 26A, which provide connectivity to the internal switch fabric 30 of data center 1. In this example, switch fabric 30 is provided by interconnected top-of-rack (TOR) switches 22A, 24A, 26A and distribution layer switches 16A, 16B. When SMS 4 initiates a storage data transfer operation, one or more storage devices transfer data through switch fabric 30 of the data center.

Network management system (NMS) 2 is a combination of hardware and software to monitor and administer the switching components of switch fabric 30 using a protocol such as the Simple Network Management Protocol (SNMP), which conforms to a standard defined by the Internet Engineering Task Force (IETF) to perform such configuration tasks. That is, in this example, network administrator 6 may use NMS 2 to manage the configuration of switches 16A, 16B, 22A, 24A and 26A. In this manner, the switching components may be referred to as managed network devices having configuration data that is controlled by and deployed from NMS 2. For example, network administrator 6 may use NMS 2 to send configuration data via network messages 12A and/or 12B (e.g., SNMP messages) to any of the managed network devices. NMS 2 may also gather information via SNMP from each managed network device to monitor the status of switch fabric 30. Using this information, NMS 2 develop data describing of the physical topology of switch fabric 30. NMS 2 may also monitor faults in the network and collect statistics about each managed network device. Administrators 6 may use this information to manage data center 1 and quickly respond to problems within the data center. Further details regarding SNMP can be found in Harrington et al., RFC 3411, "An Architecture for Describing Simple Network Management Protocol (SNMP) Management Frameworks," Network Working Group, the Internet Engineering Task Force draft, December 2002, available at http://tools.ietf.org/html/rfc3411, the entire contents of which are incorporated herein by reference. Although the examples described herein are illustrated using SNMP, other configuration protocols may also used to implement aspects of the present disclosure. Examples of configuration protocols may include Common Management Information Protocol (CMIP), Transaction Language 1 (TL1), or any other suitable protocol.

SMS 4 is a combination of hardware and software that allows administrator to schedule and control the specific data transfer operations carried out within data center 1. For example, SMS 4 allows administrator 6 to define storage data transfer operations between storage devices, e.g., 22B-D, 24B-D, 26B-D in storage network 32, as well as allowing the administrator to monitors the resource usage, health, and contents of the storage devices. SMS 4 also configures storage devices, e.g., primary storage device 22B, to function as a particular type of storage in a storage network. For example, SMS 4 may configure backup storage device 22C and disaster storage device 22D to function as backup and disaster storage devices, respectively. SMS 4 configures and monitors storage devices, e.g., backup storage device 22C, by sending storage messages 14 from SMS 4 to backup storage device 22C. Storage message 14 contains configuration information to query or change the operation of a storage device. In one example, a storage message may be an extensible markup language file (XML).

Under the direction of administrator 6, SMS 4 may initiate storage data transfer operations within data center 1. A storage data transfer operation is any data transfer or data query from one storage device to another storage device within data center 1. Administator 6 may, for example, interact with SMS 4 to define a plurality of storage data transfer policies. In general, a storage data transfer policy is a definition of a storage data transfer operation to be carried out within data center 1 and may be defined in a file or object, e.g., a storage data transfer policy may be stored as an XML file or other software object or as a rule within a database of SMS 4. Multiple, different categories of storage data transfer operations may be defined by SMS 4. A periodic backup is one category of storage data transfer operations. SMS 4 automatically sends a message to a storage system that initiates a periodic backup at scheduled times, intervals, and/or according to specific events. For example, a periodic backup may transfer data from primary storage device 24A to backup storage device 26A every morning at 3:00 AM as illustrated by data transfer 28B. Periodic backups may be useful for data archival, data protection, and data mirroring.

Another category of storage data transfer operations includes synchronous backups. A synchronous backup is a storage data transfer operation that reflects every write operation of the primary storage device onto a secondary storage device immediately after the write operation occurs. For example, a write operation performed on primary storage device 22B is immediately reflected onto primary storage device 24B by a synchronous backup as illustrated by data transfer 28A. Synchronous backups may be useful for disaster recovery and data mirroring. Periodic backups and synchronous backups are described for example purposes only, and numerous other categories of storage data transfer operations are possible.

Storage devices 22B-D, 24B-D, 26B-D typically represent various types of storage systems, such as Storage Area Networks (SANs) and Network-attached Storage (NAS), and provide large volumes of computer-readable storage media. Examples of such storage media include magnetic hard discs, optical discs, and tape backup systems or other archive systems. Storage devices 22B-D, 24B-D, 26B-D may further include computer hardware and software to manage the operation of the one or more computer readable media. For example, the computer hardware and software may process storage messages 14 received from SMS 4. Storage messages 14 change the operation of the storage devices, e.g., by initiating a storage data transfer operation or by modification of settings with respect to data mirroring or data storage functions. Storage network 32 refers generally to one or more storage devices 22B-D, 24B-D, 26B-D connected to switch fabric 30. Storage devices 22B-D, 24B-D, 26B-D, may be connected to switch fabric 30 by any well-known networking technologies.

Switch fabric 30 includes one or more interconnected managed network devices. A managed network device may include a switch, router, or other network device capable of transmitting network packets. Top-of-rack (TOR) switches 22A, 24A, and 26A are examples of managed network devices. TOR switches provide connected storage devices 22B-D, 24B-D, 26B-D with access to the switch fabric. More generally, TOR switches 22A, 24A, and 26A form the access layer of the switch fabric and provide devices with access to services provided by the distribution layer switches. Devices are connected to TOR switches by an access layer connection 20. Access layer connection 20 may be, e.g., a Gigabit Ethernet connection.

TOR switches 22A, 24A, and 26A may provide layer 2 (MAC address) and/or layer 3 (IP address) switching functionality. Distribution layer switches 16A and 16B aggregate connections of access layer switches, e.g., TOR switches 22A, 24A, 26A. Distribution layer switches are connected to TOR switches by distribution layer connections 18. Distribution layer connection 18 may be, e.g., a Gigabit Ethernet connection. Data en route from one storage device to another may pass through one or more TOR switches and one or more distribution layer switches. For example, in a storage data transfer operation such as a periodic backup, data transfer 28B may transfer data through a network path including primary storage device 24B, TOR switches 24A and 26A, distribution layer switch 16B, and backup storage device 26B.

Managed network devices, e.g., TOR switches and/or distribution layer switches, include one or more processors and a memory, and that are capable of executing one or more software processes. For example, a managed network device may be a router, switch, bridge, access server, computer or printer. Managed network devices receive network messages 12A, 12B via SNMP. Upon receiving network message 12A or 12B, a managed network device may modify its current configuration based on configuration data in the network message. For example, configuration data may specify a virtual local area network (VLAN), a class of service (CoS), and/or a set of logical interfaces. A managed network device may use configuration data to provide a VLAN, CoS, and set of logical interfaces.

To quickly and reliably perform storage data transfer operations, NMS 2 may automatically deploy configuration data to managed network devices in switch fabric 30, potentially in real-time, to provision switching resources so as to provide a specified class of service for each storage data transfer operations. For example, initially, administrator 6 interacts with SMS 4 to define a storage data transfer operation. For example, in FIG. 1, administrator 6 may configure storage network 32 to define a synchronous backup that transfers data from primary storage device 22B to primary storage device 24B whenever a write operation is performed on primary storage device 22B. SMS 4 creates a storage data transfer policy corresponding to the synchronous backup and may configure the storage devices by issuing storage messages 14.

Once SMS 4 has created the storage data transfer policy, NMS 2 is informed of the new policy so as to effect the automatic provisioning of the switching resources. In one example, SMS 4 performs a "push" operation that sends the storage data transfer policy in an integration message 10B to NMS 2. Alternatively, in a "pull" operation, NMS 2 may regularly poll SMS 4 with an integration message 10A to learn of new or updated storage data transfer policies. If NMS 2 identifies a new storage data transfer policy, NMS 2 retrieves the policy. In another example, NMS 2 and SMS 4 are implemented in a single computer system and therefore interprocess communication mechanisms, e.g., message queues, enable NMS 2 and SMS 4 to share storage data transfer policies. In another example, an Operation Support System (OSS) directs and integrates SMS 4 and NMS 2 thereby enabling communication of storage data transfer policies between SMS 4 and NMS 2. The foregoing techniques are examples, and any method of sharing information between a source and a destination may be used enable NMS 2 to gain information describing the storage data transfer operations from SMS 4.

Upon NMS 2 receiving integration message 10B that includes the storage data transfer policy, NMS 2 analyzes the storage data transfer policy to dynamically generate configuration used to service the storage data transfer operation—in the example of FIG. 1, a synchronous backup. NMS 2 sends the configuration data to managed network devices in order to automatically dynamically and potentially temporarily provision a Virtual Local Area Network (VLAN) inside switch fabric 30 to service the data transfer. The provisioning may include configuration data specifying the specific physical interfaces to be traversed, corresponding logical interfaces to be used with the physical interfaces, a VLAN identifier, and a Class of Service setting defining bandwidth allocation for prioritizing queuing services associated with the VLAN.

To provision the logical network, NMS 2 analyzes the physical topology of switch fabric 30 based on the storage data transfer policy. NMS 2 identifies a physical path in the switch fabric 30 through which the synchronous backup data will flow. NMS 2 may identify the physical path of the data transfer by analyzing the storage data transfer policy to identify the IP (Internet Protocol) addresses of primary storage devices 22B and 24B. If primary storage devices 22B, 24B have multiple network interface cards (NICs) with multiple physical ports, NMS 2 identifies the IP addresses of each physical port.

NMS 2 uses the IP addresses of the of the primary storage devices to identify a physical path through switch fabric 30 from the source primary storage device, e.g., primary storage device 22B, to the destination primary storage device, e.g., primary storage device 24B. Managed network devices contain physical ports that are interconnected to form the physical path through which data flows in a storage data transfer operation. The physical path includes the physical ports and physical interconnections of managed network devices from the source storage device, e.g., primary storage device 22B, to the destination storage device, e.g., primary storage device 24B. A single physical port of managed network device may carry data traffic of multiple storage data transfer operations.

Managed network devices may also support the construct of logical ports that are bound to the physical ports. Logical ports are software constructs created by managed network devices to provide network services such as a Class of Service (CoS) setting and/or Virtual Local Area Network (VLAN) services. Multiple logical ports may be created on top of a single physical port. Each logical port may be associated with a unique storage data transfer operation and each logical port may be configured provide a different level of service.

In the present example, NMS 2 analyzes the storage data transfer policy and the physical topology of switch fabric 30 to select a physical path through which synchronous backup data will flow. After identifying a physical path, NMS 2 generates configuration data that defines logical ports on each of the managed network devices in the physical path. In addition, NMS 2 generates configuration data that defines a VLAN on each of the managed network devices in the physical path. NMS 2 also generates configuration data that associates the VLAN with each of the logical ports to provide robust packet forwarding. Configuration data include settings to be applied to the managed network devices that form the switch fabric 30, e.g., TOR switch 22A and/or distribution layer switch 16A. The configuration data settings configure the managed network devices to provide optimal service for synchronous backup data transfers.

In addition to creating logical ports and a VLAN, NMS 2 also analyzes the category of the storage data transfer operation to provide an appropriate CoS setting. In this example, the storage data transfer operation is a synchronous backup. In a synchronous backup, each write operation on primary storage device 22B must be reflected immediately and accurately on primary storage device 24B. Thus, neither network packet loss nor network packet delay is acceptable in a synchronous backup. A Class of Service (CoS) may be represented by an enumerated set of classification levels (e.g., 1 to 10 or gold, silver, premium) and typically influences bandwidth allocation and queuing priority for traffic, thereby provided differentiated forwarding preferences for the different service levels. In some case, CoS may be carried by a 3 bit field within an Ethernet frame header that specifies a priority value of between 0 and 7. Alternatively, class of service may be represented by a different MPLS label or carried by the experimental (EXP) bits within an MPLS label. In the context of VLANs, different VLAN tags or ranges of VLAN tags may be used to indicate provide a logical layer two (L2) switching domain but a certain CoS. Increasing the CoS setting of particular network packets causes managed network devices along the path to transfer the particular network packets more quickly and/or reliably relative to other packets being handled by those same devices. In the case of a synchronous backup, because each write operation must be reflected immediately and accurately, data transfers between the source and destination storage devices require the highest CoS setting possible. NMS 2 generates configuration data defining the CoS setting to be applied to each logical port of each managed network device in the physical path. In addition to configuring a CoS setting based on the category of storage data transfer operation, NMS 2 may define a CoS setting according to the type of customer associated with a particular storage data transfer operation.

NMS 2 packages the configuration data created from analyzing the storage data transfer operation into one or more network messages 12A, 12B, e.g., SNMP messages, and deploys the configuration data to managed network devices positioned along the physical path. NMS 2 sends the configuration data in network messages 12A, 12B to these managed network devices of switch fabric 30 that are included in the physical path. In this example, the physical path of the synchronous backup includes TOR switch 22A, distribution layers switch 16A, and TOR switch 24A. In this way, a conventional SNMP management interface may be leveraged for automatically and dynamically creating a VLAN to service the data transfer operation.

Each managed network device in the physical path of the storage data transfer operation receives a network message 12A, 12B containing the configuration data. In this way, NMS 2 can configure each managed network device in the physical path to provide the logical network for the storage data transfer operation. NMS 2 can therefore maintain complete control of the storage data transfer operation and the physical path using the logical network. In the example of a synchronous backup in FIG. 1, a managed network device, e.g., TOR switch 22A, receives a network message, e.g., network message 12B, containing configuration data based on the storage data transfer operation. Using the configuration data, TOR switch 22A creates a logical port on the physical port identified by NMS 2 as part of the physical path. The logical port created on TOR switch 22A is then configured to the highest CoS as specified by the configuration data. The VLAN is also configured on the logical port by TOR switch 22A. In this manner, NMS 2 configures each physical port of each managed network device in the physical path of the storage data transfer operation. When all managed network devices included in the physical path of the synchronous backup have been configured, the logical network has been created and data may be transferred quickly and reliably from primary storage device 22B and primary storage device 24B.

In some examples, a storage data transfer policy on SMS 4 may be deleted by an administrator. NMS 2 obtains information specifying the deletion using any of the aforementioned techniques, e.g., push, polling, interprocess communication, or OSS. Upon receiving information specifying the deletion, NMS 2 creates new configuration data. This newly created configuration data will terminate the current configurations of managed network devices that are presently configured to service the storage data transfer operation. In other words, the new configuration data will return each managed network device to its prior state. NMS 2 sends the new configuration data to managed network devices presently configured to service the storage data transfer operation. Each managed network devices uses the new configuration data to return to its prior state.

Various aspects of the disclosure may provide, in certain instances, one or more benefits and advantages. For example, NMS 2 automates the analysis of storage data transfer operations and automatically configures managed network devices in switch fabric 30 based on the analysis of NMS 2. Coordination between a Storage Administrator and a Network Administrator may also be unnecessary because NMS 2 and SMS 4 are integrated to send and receive information about storage data transfer operations. Various aspects of the disclosure also ensure that network resources of managed network devices are properly allocated to the specific requirements of various categories of storage data transfer operations. Additionally, NMS 2 ensures optimal performance of the entire switch fabric 30 based on NMS 2's management of information specifying storage data transfer operations. Aspects of the disclosure also work in many scenarios possible in a data centers, e.g., Network Attached Storage (NAS) and Storage Area Networks (SAN).

Figure 2:
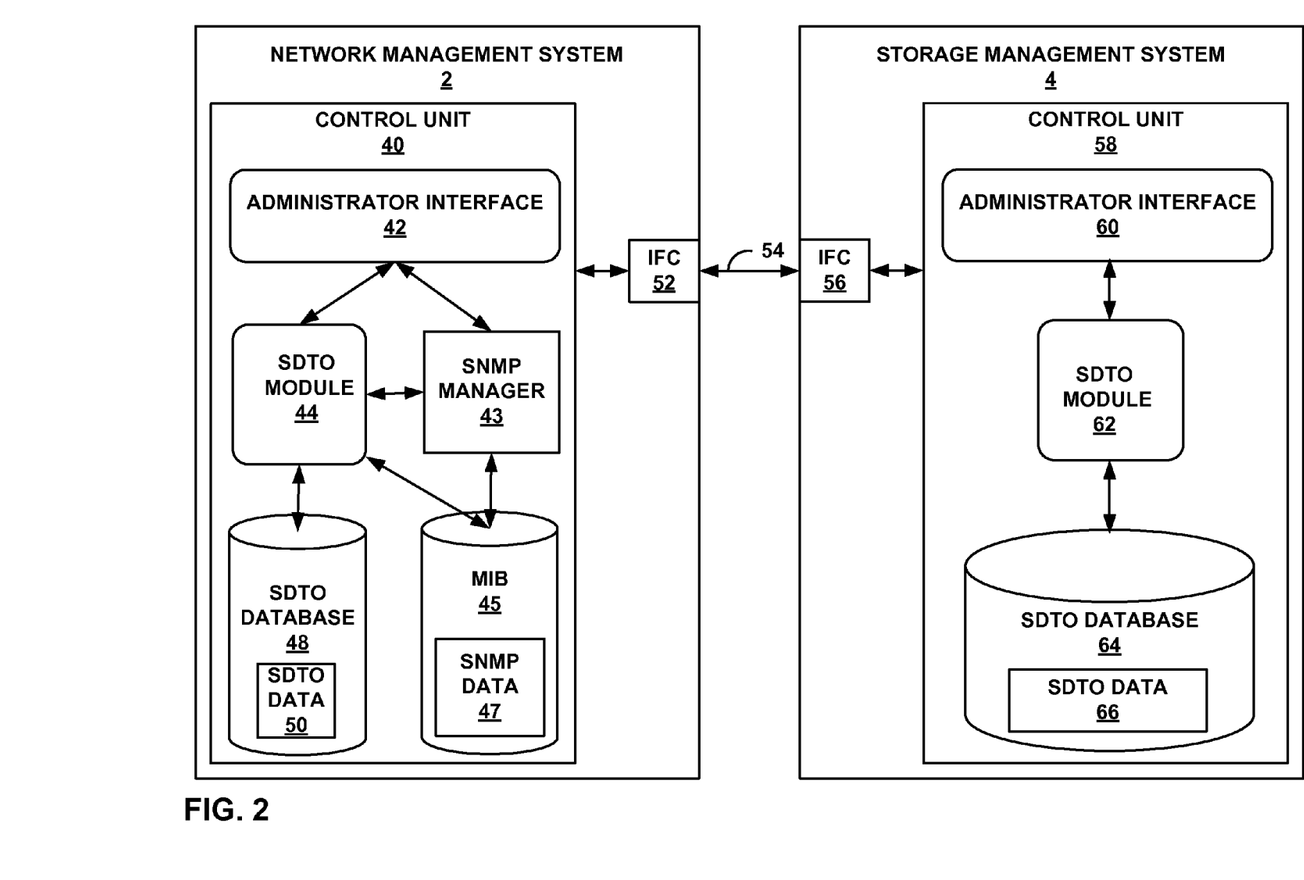
FIG. 2 is a block diagram illustrating further an example of a storage management system and a network management system that may implement the techniques described in this disclosure.

FIG. 2 is a block diagram illustrating further an example of a storage management system (SMS) 4 and a network management system (NMS) 2 that may implement the techniques described in this disclosure. NMS 2 and SMS 4 are connected via network interfaces 52 and 56 using network elements 54, which generally represent switch fabric 30 of FIG. 1. More generally, network elements 54 represent any communication devices and elements (e.g., switches, routers, links) of a larger network that may comprise any type of network capable of transmitting data, such as a layer three (L3) packet-switched network (e.g., the Internet) operating over one or more layer two (L2) networks (e.g., an Ethernet or multi-packet label switching (MPLS) network) that may be used to connect different areas of a data center.

As shown in example FIG. 2, network management system (NMS) 2 includes control unit 40, administrator interface 42, SNMP manager 43, Management Information Base (MIB) 45, storage data transfer operation (SDTO) module 44, storage data transfer operation (SDTO) database 48, storage data transfer operation (SDTO) data 50 and one or more network interfaces 52. SDTO database 48 and SDTO 50 may be replicated version of some or all of storage data transfer policies defined within SDTO database 64 as SDTO data 66.

Control unit 40 of NMS 2 provides an operating environment for SNMP manager 43, administrator interface 42, SDTO module 44 and management information base (MIB) 45. MIB 45 is a hierarchy of information that specifies managed objects in device 5A managed by SNMP manager 43. MIB 45 includes managed object instances that each represents an aspect of SNMP management data 25 (illustrates as and hereinafter "SNMP data 25"), which may include, for example, configuration or descriptive data for devices within a data center switch fabric. SNMP manager 43 represents an exemplary instance of an SNMP management application or, more generally, a network management application. In some examples, a network management application may include a device manager. Although FIG. 2 illustrates an SNMP manager 43, a device manager implementing other communication protocols may also be used. SNMP manager 43 is one example of a network management module. In one example, SNMP manager 43 monitors and controls one or more of devices 5 of FIG. 1. A network operator or other administrator interacts with administrator interface 42 to direct SNMP manager 43 to manage a given network device in a specified manner, e.g., to modify the configuration of the device or to monitor the performance of the device by requesting variable information available from the device according to MIB 45. For example, the administrator may enter commands to view and modify SNMP data 47 and ultimately to deploy the configuration data to a MIB of within the managed device as operational configuration data for that device. As another example, the operator may enter commands to retrieve the operational data from the MIB of the managed device. In another example, SNMP manager 43 may be configured to automatically check the configuration or monitor the performance of the managed device at specified times, e.g. twice per day or once per month. The current configuration of SMNP manager 43 may be contained in SNMP data 47. MIB 45 and SNMP data 47 may each be stored in the form of one or more tables, databases, linked lists, radix trees, or other suitable data structure. In some examples, a configuration protocol other than SNMP, e.g., CMIP, may be used to implement aspects of the present disclosure. In such examples, corresponding data structures may be used to implement configuration protocol. For example, an implementation using CMIP may include CMIP MIBs. In some examples, NMS 2 may include one or more databases (not shown), which store additional data about network devices and the switch fabric. Examples of additional data include data describing the physical topology of the switch fabric, performance data of network devices and/or the switch fabric, services presently implemented by network devices, and any other relevant data about the network devices and/or the switch fabric not stored in MIB 45 or SDTO database 48.

Storage management system (SMS) 4 includes control unit 58, administrator 60, SDTO module 62, SDTO database 64, SDTO data 66 and one or more network interfaces 56. Administrator 60 administers and controls the scheduled and asynchronous data transfer operations that occur within storage network 32.

Control units 40 and 58 may each include one or more processors (not shown) that execute software instructions, such as those used to define a software or computer program, stored to a computer-readable storage medium (not shown). Examples of computer-readable storage media include a storage device (e.g., a disk drive, or an optical drive), or memory (such as Flash memory, random access memory or RAM) or any other type of volatile or non-volatile memory, that stores instructions to cause a programmable processor to perform the techniques described herein. Alternatively, or in addition, control units 40 and 58 may each comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

SDTO modules 44 and 62 include instructions executable by control units 40 and 58 and provide seamless integration between NMS 2 and SMS 4. SDTO module 44 may, for example, be viewed as a remote agent that interacts with SDTO module 62 of SMS 4 so as to recreate data transfer policies within SDTO database 48 based on the data transfer policies defined within SDTO database 64. In this way, SDTO modules 44 and 62 perform multiple functions related to the creation, execution, and deletion of storage data transfer policies. In addition, SDTO modules 44 and 62 store and retrieve storage data transfer policies from SDTO databases 48 and 64. SDTO data 50, 66 are stored in SDTO databases 48, 64 and include storage data transfer policies.

In one example, in response to direct user input or input from a script, SDTO module 62 of SMS 4 creates a local storage data transfer policy that defines a storage data transfer operation, e.g., a synchronous backup. SDTO module 62 stores and later retrieves the storage data transfer policy for execution via storage system 32. In addition, this information is replicated to NMS 2 for service provisioning for the particular data transfer. For example, SDTO module 62 may send the storage data transfer policy to NMS 2. During execution, SDTO module 62 facilitates the storage data transfer operation that causes one or more storage devices to perform data transfers. At a later time, SDTO module 62 may delete the storage data transfer policy from SDTO database 64 and instruct SDTO module 44 to do the same.

In one example, SDTO module 44 of NMS 2 receives a storage data transfer policy from SMS 4. SDTO module 44 may receive storage data transfer policies according to any of the examples described in FIG. 1 including "push" operations, "pull" operations, interprocess communication mechanisms, or via OSS integration. SDTO module 44 may store and later retrieve the storage data transfer policy for analysis. SDTO module 44 may delete the storage data transfer policy from SDTO database 48.

SDTO module 44 analyzes the replicated storage data transfer policies in order to generate configuration data that may be deployed by way of the configuration protocol, e.g., SNMP. As described in FIG. 1, configuration data is sent to managed network devices in the physical path of the switch fabric. Each managed network device that receives configuration data configures itself to provide switching services for the storage data transfer operation based on the configuration data. In one example, SDTO module 44 analyzes a storage data transfer policy to identify the IP addresses of the source storage device and the destination storage device. If a storage device has more than one network interface card, SDTO module 44 identifies the IP address of each network interface card. SDTO module 44 uses its information specifying the switch fabric and the IP addresses to identify a physical path through the switch fabric. For example, SDTO module 44 uses the IP addresses of the source and destination storage devices to identify a physical path in the switch fabric including one or more managed network devices. SDTO module 44 may use pre-defined, user-specified requirements to identify which managed network devices will be included in the physical path. User-specified requirements may include performance, security, and/or reliability.

SDTO module 44 also identifies a Class of Service (CoS) setting for a storage data transfer operation. In one example, SDTO module 44 analyzes the category of storage data transfer operation, e.g., periodic backup or scheduled backup. SDTO module 44 identifies the most appropriate CoS setting and defines this setting in configuration data. In some examples, SDTO module 44 may identify the most appropriate CoS setting from SDTO database 48. SDTO database 48 may contain pre-defined, user-specified settings associated with each category of storage data transfer operation.

SDTO module 44 also analyzes a storage data transfer policy to configure a Virtual Local Area Network (VLAN). SDTO module 44, after identifying the physical path in the switch fabric, defines VLAN settings that will be sent as configuration data to each managed network device in the physical path. Each managed network device uses the VLAN settings in the configuration data to set up the VLAN. For example, a managed network device establishes VLAN services on the appropriate logical port of the managed network device as specified by the configuration data.

Figure 3:
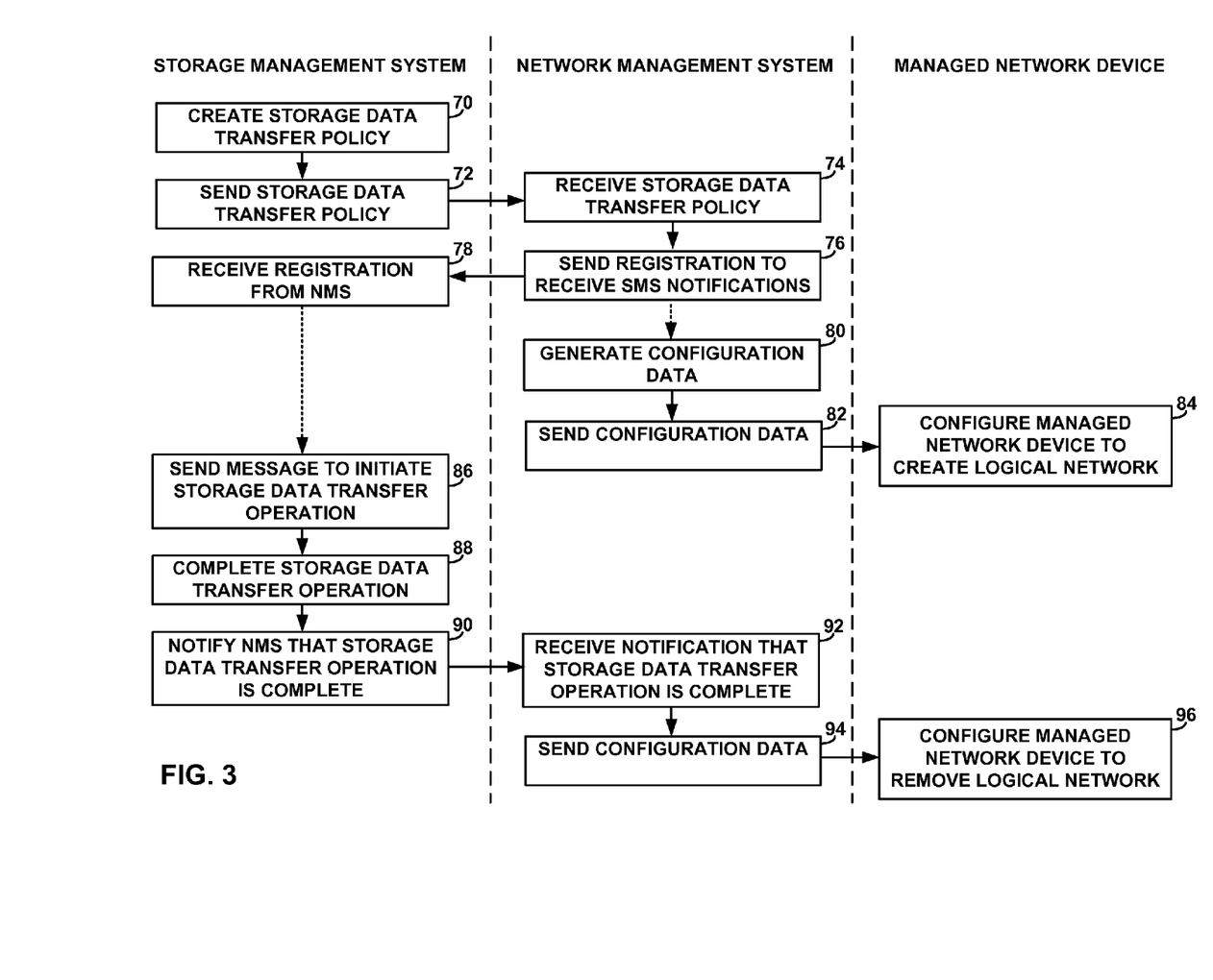
FIG. 3 is a flow chart illustrating an example method a periodic backup performed by a storage management system integrated with a network management system in accordance with the techniques of this disclosure.

In some examples, e.g., the example method of FIG. 3, a periodic backup may be performed. In the example of a periodic backup, SDTO module 44 may analyze the storage data transfer operation to identify the start time of the storage data transfer operation. SDTO module 44 may store this information in SDTO database 48 for later retrieval. SDTO module 44 uses the start time to configure managed network devices in advance of the storage data transfer operation. In the example of a periodic backup, NMS 2 registers with SMS 4 because SMS 4 must notify the network management system when a storage data transfer operation has completed. To register, NMS 2 sends registration data to SMS 4, and SMS 4 may process and store the registration data in SDTO database 64 for later retrieval. When a storage data transfer operation completes, SMS 4 uses the registration information to notify NMS 2 that the scheduled backup has completed.

FIG. 3 is a flow chart illustrating an example method a periodic backup performed by a storage management system integrated with a network management system in accordance with the techniques of this disclosure. Example techniques of the present disclosure, e.g., the example technique of FIG. 1 may be adapted to perform a periodic backup. For example, the method illustrated in FIG. 3 may be performed by SMS 4, NMS 2, switch fabric 30, and storage network 32 as shown in FIGS. 1 and/or 2. In the example method shown in FIG. 3, a storage management system initially creates a storage data transfer policy that defines a storage data transfer operation (70). In the example shown in FIG. 3, the storage data transfer operation is a periodic backup. The periodic backup transfers data through the switch fabric between one or more storage devices at scheduled times, intervals, and/or according to specific events. The storage management system may also store the storage data transfer policy for later retrieval, e.g., in a storage data transfer operations database 64 as shown in FIG. 2. After creating the storage data transfer policy, the storage management system sends the storage data transfer policy to the network management system (72).

The network management system receives the storage data transfer policy from the storage management system (74). The network management system stores the storage data transfer policy for later retrieval, e.g., in a storage data transfer operations database 48 as shown in FIG. 2. In the example of FIG. 3, the network management system must be notified when the periodic backup has completed in order to automatically release network resources of managed network devices. To receive a notification when a storage data transfer operation has completed, the network management system sends registration information to the storage management system (76). The storage management system receives the registration information from the network management system (78). The storage management system may store the registration information for later retrieval to notify the network management system when a storage data transfer operation has completed.

Prior to the start time of the periodic backup, the network management system analyzes the storage data transfer policy. From this analysis, the network management system generates configuration data (80). The configuration data is used to configure the managed network devices in the switch fabric. The configuration data defines a logical network within the switch fabric that includes a virtual local area network (VLAN), a class of service (CoS), and/or a set of logical interfaces. The network management system may store the configuration data for later retrieval.

After generating the configuration data and shortly before the start time of the periodic backup, the network management system sends the configuration data to managed network devices of the switch fabric (82). For example, the network management system may send the configuration data via SNMP. The managed network devices receive the configuration data, and using the configuration data, create a logical network within the switch fabric (84). For example, if the configuration data specifies a VLAN, CoS settings, and set of logical interfaces, a managed network device may configure itself according to the configuration data to create the logical network. At the completion of (84), the managed network devices have been configured create a logical network within the switch fabric of the data center to service the particular storage data transfer operation in accordance with the CoS.

After each managed network device has been configured, the storage management system sends a message to the storage system that initiates the storage data transfer operation, i.e., the periodic backup (86). Data transfer traffic flows quickly and reliably because the network management system has configured the managed network devices to service the storage data transfer operation. In this example of a periodic backup, data flows from a source storage device connected to the switch fabric to a destination storage device. Once all data specified by the storage data transfer policy has been transmitted, the storage data transfer operation is complete (88). Upon completion of the storage data transfer operation, the storage management system notifies the network management system that the transfer operation is complete (88). The storage management system provides this notification so the network management system can release network resources of the managed network devices that facilitated storage data transfer operation.

The network management system receives the notification that the storage data transfer operation has completed (92). The network management system may generate configuration data to remove the logical network from the switch fabric, i.e., revert the managed network devices to pre-existing configurations before the periodic backup. Reverting the managed network devices to pre-existing configurations enables the network management system to beneficially release network resources when no longer needed, i.e., when the periodic backup has completed.

After generating the configuration data to remove the logical network from the switch fabric, the network management system sends this configuration data to the managed network devices (94). The network management system may send the configuration data to the managed network device via SNMP. Upon receiving the configuration data from the network management system, the managed network devices use the configuration data to remove the logical network (96). For example, a managed network device may use the configuration data to remove the VLAN, CoS settings, and logical interfaces. By removing these settings and thereby freeing up network resources, the managed network devices can service other operations more efficiently.

Figure 4:
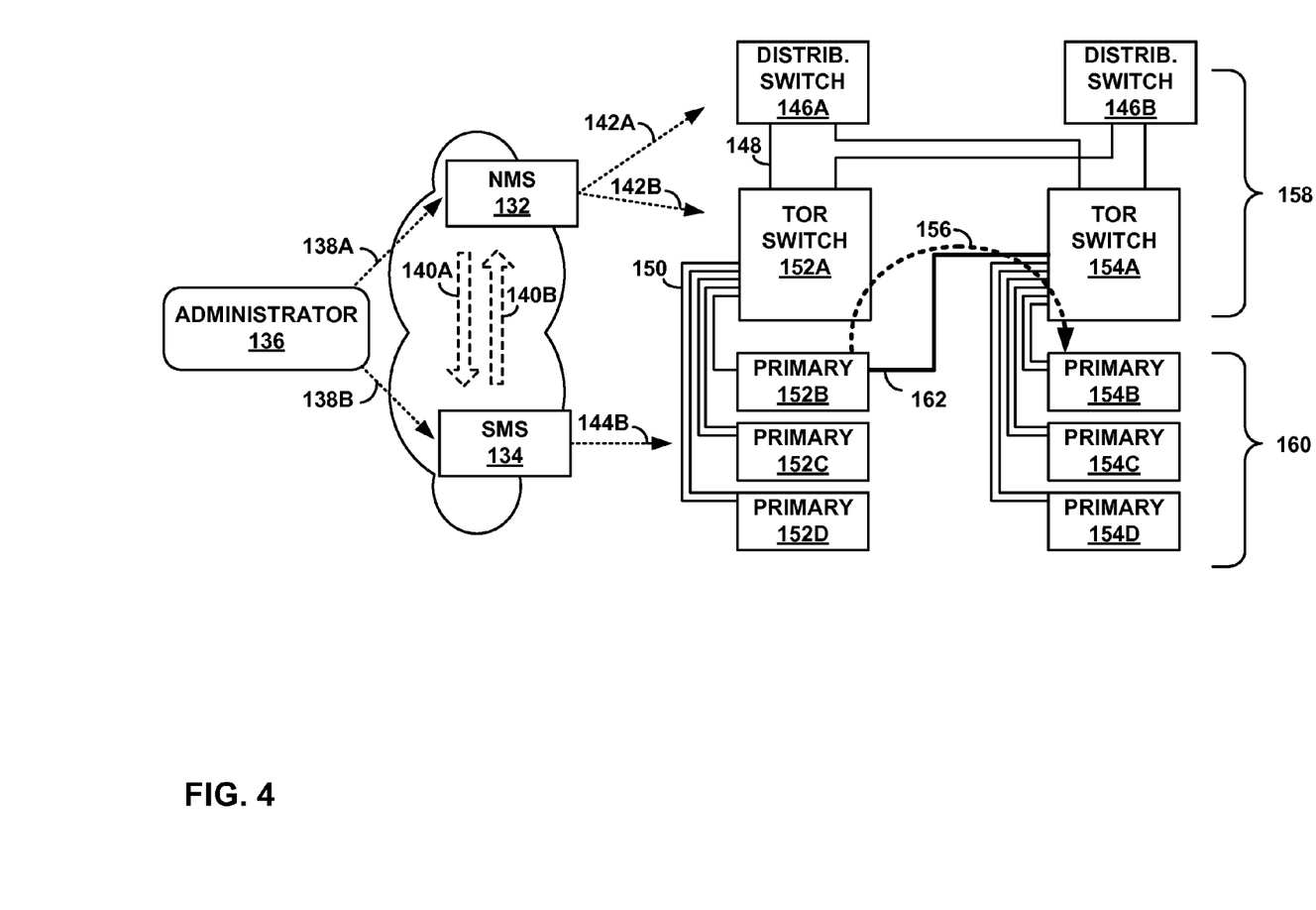
FIG. 4 is a block diagram illustrating an example of a network management system powering off physical ports of managed network devices when not in use in accordance with the techniques of this disclosure.

FIG. 4 is a block diagram illustrating an example of a network management system powering off physical ports of managed network devices when not in use in accordance with the techniques of this disclosure. Elements of FIG. 4 contain the same properties and characteristics of FIG. 1 unless otherwise described hereinafter. In the data center pictured in FIG. 4, each storage device, e.g., primary storage device 152B, contains a plurality of Network Interface Controllers (NIC) each having a corresponding physical port. Each managed network device of switch fabric 158, e.g., TOR switch 152A, also contains one or more physical ports. Each storage device is connected to a TOR switch by an access layer connection 150 from a physical port of the storage device to a physical port of the managed network device.

In the example of FIG. 4, primary storage device 152B includes a physical port (not shown) dedicated to transferring data directly to storage devices serviced by TOR switch 154A. The dedicated physical port only transfers data for internal storage data transfer operations occurring between two storage systems in storage network 160. As shown in FIG. 4, primary storage device 152B is connected to TOR switch 154A via network connection 162. Network connection 162 is a network connection that directly connects the dedicated physical port of primary storage device 152B to TOR switch 154A. In the example of FIG. 4, SMS 134 sends a storage message 144B to a storage system to initiate an internal storage data transfer operation between two storage systems in storage network 160. When the storage data transfer operation occurs between the two storage systems in storage network 160, data transfer 156 flows through network connection 162.

Generally, dedicated physical ports remain powered on even when not in use. Continuously powering on such physical ports when not in use leads to inefficient consumption of energy in the data center. Power savings can therefore be achieved in the data center by turning off each dedicated physical port that is not in use.

As described in FIGS. 1, 2, and 3, a storage management system (SMS) 134 defines a storage data transfer policy corresponding to a storage data transfer operation. In the example of FIG. 4, SMS 134 defines a periodic backup and sends the storage data transfer policy in an integration message 140B to network management system (NMS) 132. NMS 132 analyzes the storage data transfer policy to identify each physical port in the switch fabric that is dedicated to transferring only data in the periodic backup. NMS 132 also analyzes the start time of the periodic backup. Because NMS 132 knows each dedicated physical port in the switch fabric and the start time of the periodic backup, NMS 132 can selectively power on dedicated physical ports only when needed, i.e., just prior to the storage data transfer operation. Alternatively, NMS 132 may register with SMS 134 to be notified by SMS 134 shortly before the storage data transfer operation begins. In addition, NMS 132 registers with SMS 134 in a periodic backup to be notified when the backup is complete. NMS 132 can power off dedicated physical ports when notified by SMS 134 that the storage data transfer operation is complete.

In some examples, a dedicated physical port of a managed network device transfers data of multiple storage data transfer operations at the same time. For example, two periodic backups may be executing at the same time, i.e., the periodic backups overlap in time. In this case, NMS 132 powers on the dedicated physical port prior to the earliest periodic backup and only powers down the dedicated physical port after the last periodic backup has completed. In this way, NMS 132 ensures that no storage data transfer operation is interrupted by a physical port that is powered down prematurely.

In some examples, logical ports are used to transfer non-storage data transfer operation traffic and storage data transfer operation traffic on the same physical port. Because NMS 132 maintains information specifying storage data transfer operations and the physical topology of switch fabric 158, NMS 132 can monitor traffic on both logical and physical ports. If NMS 132 determines that data traffic is present on one or more logical ports of a managed network device, NMS 132 will not power down the physical port to which the logical ports are bound.

In some examples, SMS 134 monitors the status of each network connection of each storage device to identify network connection failures that will prevent a storage data transfer operation from executing. When NMS 132 powers off a physical port of a managed network device, SMS 134 may interpret the powered-off physical port as a network connection failure and SMS 134 will raise an alert. To avoid such false alerts, NMS 132 sends integration messages 140A to SMS 134 when NMS 132 shuts down physical ports. Integration messages 140A include information generated by NMS 132 to notify SMS 134 of the physical ports to be powered off. In this way, NMS 132 can improve energy efficiency in the data center and prevent SMS 134 from experiencing false alarms relating to network failures.

Techniques of the present disclosure are also applicable to different configurations of storage devices and network protocols in a data center. In one example, Network Attached Storage (NAS) storage devices are interconnected via Ethernet switches, i.e., managed network devices, and data transfers occur over the Transmission Control Protocol/Internet Protocol (TPC/IP) stack. In another example, Storage Area Network (SAN) storage devices are interconnected via Ethernet switches and data transfers are executed using the Internet Small Computer System Interface (iSCSI) standard over the TCP/IP stack. In both examples, the network management system uses IP addresses to identify storage devices participating in the storage data transfer operation.

Figure 5:
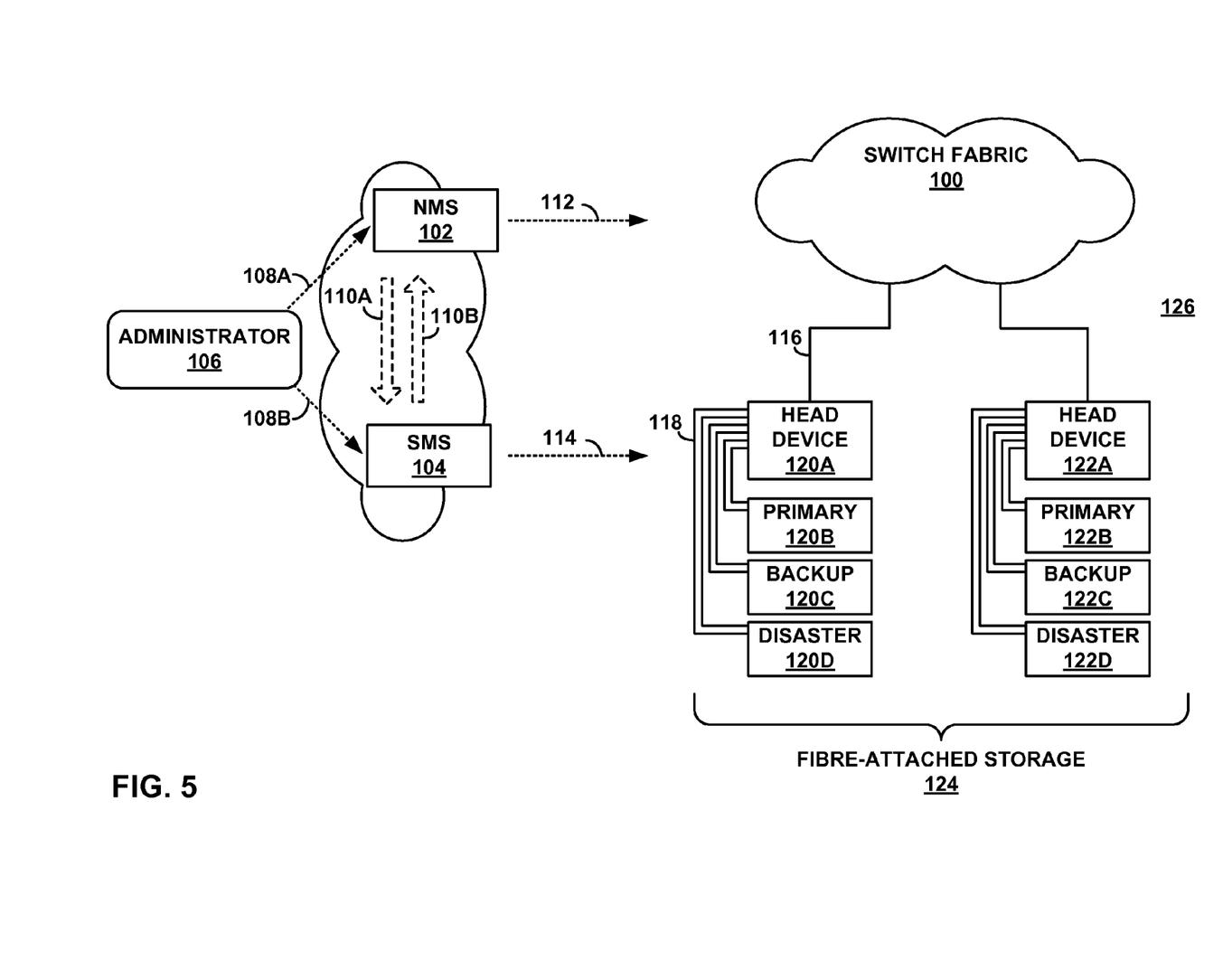
FIG. 5 is a block diagram illustrating an example of integration between a network management system and a storage management system using fibre-attached storage to service a storage data transfer operation in accordance with the techniques of this disclosure.

Techniques of the present disclosure are extensible to environments that do not use IP layer (layer 3) addressing, e.g., the SAN Fibre Channel over Ethernet (FCoE) environment shown in FIG. 5. FCoE runs directly on Ethernet without the internet protocol (IP) layer. FIG. 5 is a block diagram illustrating an example of integration between a network management system (NMS) 102 and a storage management system (SMS) 104 using fibre-attached storage to service a storage data transfer operation. Techniques of the present disclosure, e.g., as shown in FIGS. 1, 2, and 3, may be implemented by a Storage Area Network (SAN) 126 as shown in FIG. 5 that includes fibre-connected storage devices, e.g., primary storage devices 120A, 122A; backup storage devices 120C, 122C; and disaster storage devices 120D, 122D. In FIG. 5, each storage device is connected to a head device 120A, 122A by fibre-connection 118. Head device 120A, 122A is a Fibre Channel over Ethernet (FCoE) switch. Head device 120A, 122A is further connected to switch fabric 100 by head device network connection 116. Head device network connection 116 may be, e.g., a Gigabit Ethernet connection. Data transfers between storage devices use FCoE protocol to transfer data through, e.g., head device 120A, 122A. Data transfers between storage devices each connected to separate head devices pass through switch fabric 100.

Media Access Control (MAC) addresses are used by NMS 102 to service storage data transfer operations when techniques of the present disclosure are implemented using Ethernet without the internet protocol (IP) layer. MAC addresses are suitable substitutes for IP addresses because storage devices are connected through a common switch fabric in a data center. MAC addresses provide NMS 2 with complete information specifying the layer 2 topology of switch fabric 100. Because NMS 102 has complete information specifying the layer 2 topology, the physical path between storage devices is known. MAC addresses therefore provide sufficient identification of managed network devices and storage devices to implement techniques of the present invention. Thus, the techniques of the present disclosure can be advantageously implemented in environments that do not use IP layer addressing.

Figure 6:
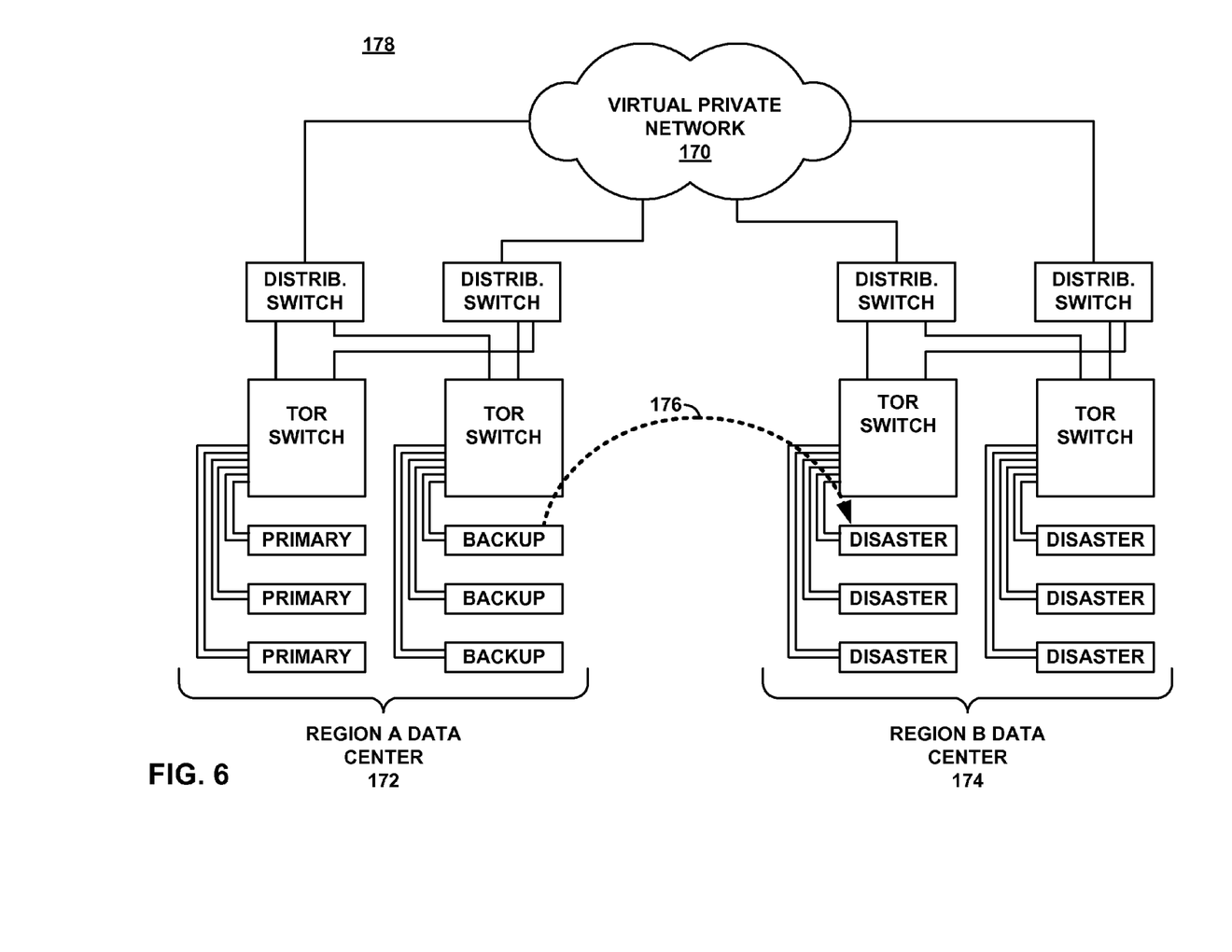
FIG. 6 is a block diagram illustrating an example of a data transfer from one data center to another using a wide-area network to service a storage data transfer operation in accordance with the techniques of the present disclosure.

FIG. 6 is a block diagram illustrating an example of a data transfer from one data center to another using a wide-area network to service a storage data transfer operation in accordance with the techniques of the present disclosure. Generally, storage devices are connected through a common switch fabric; however, techniques of the present disclosure may also be adapted to a Wide Area Network (WAN). In a WAN environment, Virtual Private LAN Service (VPLS) or similar LAN extension technologies are used to interconnect each data center. VPLS or similar LAN technologies provide services including Ethernet based multipoint to multipoint communication that enable storage devices to appear connected to a common switch fabric. Because each storage device appears connected to a common switch fabric, the network management system is able to obtain information specifying the physical topology of the switch fabric. The network management system's information specifying the physical topology permits techniques of the present disclosure to be implemented in a WAN environment.

In FIG. 6, region A data center 172 and region B data center 174 are connected by a Wide Area Network 8 and a periodic backup is performed from region A data center 172 to region B data center 174. Each region data center contains one or more storage devices connected to one or more TOR switches. Each TOR switch is connected to one or more distribution layer switches. The managed network devices and storage devices are connected via VPLS and therefore provide Ethernet based multipoint to multipoint communication. The VPLS service provides the network management system (not shown) with visibility of the physical topology of the switch fabric that connects storage devices region A data center 172 and region B data center 174.

In the example of FIG. 6, the periodic backup requires a data transfer 176 from region A data center 172 to region B data center 174. Prior to the storage management system (not shown) executing the periodic backup, the network management system generates configuration data corresponding to the periodic backup. The network management system generates the configuration data using its information that specifies the physical topology of the switch fabric. The network management system then sends the configuration data to managed network devices of the switch fabric prior to execution of the periodic backup. In this way, techniques of the present disclosure, e.g., as described in FIG. 3, may be adapted to data centers connected via wide area networks.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various embodiments of the invention have been described. These and other embodiments are within the scope of the following claims.

The invention claimed is:

1. A method comprising:
receiving, at a network management system and from a storage management system, a message that defines a storage data transfer operation within a storage network controlled by the storage management system;
generating, by the network management system, configuration data to program one or more managed network devices to service the storage data transfer operation, wherein the one or more managed network devices are connected to comprise a switch fabric; and
sending, by the network management system, the configuration data to the one or more managed network devices to create a network in the switch fabric to service the storage data transfer operation of the storage network.

2. The method of claim 1, wherein the storage network further comprises one or more storage devices connected to the switch fabric, wherein the one or more storage devices receive one or more storage messages from the storage management service to execute the storage data transfer operation.

3. The method of claim 1, wherein the message that defines the storage data transfer operation further comprises a storage data transfer policy.

4. The method of claim 1, wherein the storage data transfer operation further comprises a periodic backup, wherein the periodic backup transfers data from a source storage device of the storage network to a destination storage device of the storage network at a pre-defined time interval or upon the occurrence of a pre-defined event.

5. The method of claim 4, further comprising:
sending, by the network management system, a registration to the storage management system, wherein the storage management system uses the registration to notify the network management system that the storage data transfer operation has completed; and
receiving, by the network management system, a notification from the storage management system, wherein the notification informs the network management system that the storage data transfer operation has completed.

6. The method of claim 1, wherein the storage data transfer operation further comprises a synchronous backup, wherein the synchronous backup transfers data from a source storage device of the storage network to a destination storage device of the storage network immediately after data on the source storage device has changed.

7. The method of claim 1, wherein the one or more managed network devices comprise a switch, router, bridge, or other network device capable of transmitting network packets.

8. The method of claim 1, wherein receiving the message that defines the storage data transfer operation within a storage network controlled by the storage management system further comprises:
sending, by the network management system, a request to the storage management server for the message that defines the storage data transfer operation within the storage network controlled by the storage management system.

9. The method of claim 1, further comprising:
identifying, by the network management system, a source address of a source storage device of the storage network and a destination address of a destination storage device of the storage network based on the message that defines the storage data transfer operation within the storage network controlled by the storage management system; and
identifying, by the network management system, a physical path, wherein the physical path comprises one or more interconnected physical ports of the one or more of managed network devices, wherein the physical path is capable of transferring data from the source storage device to the destination storage device via a network connection.

10. The method of claim 9, further comprising:
identifying, by the network management system, one or more dedicated physical ports, wherein the one or more dedicated physical ports comprise a subset of the one or more physical ports of the one or more of managed network devices, wherein the one or more dedicated physical ports only transfer data of the storage data transfer operation;
prior to executing the storage data transfer operation, generating, by the network management system, configuration data to power on the one or more dedicated physical ports; and
after execution of the storage data transfer operation has completed, generating, by the network management system, configuration data to power off the one or more dedicated physical ports.

11. The method of claim 10, further comprising:
determining, by the network management system, more than one periodic backups are executing concurrently, wherein at least two of the more than one periodic backups transfer data on a dedicated physical port; and
powering off the dedicated physical port only after each of the more than one periodic backups transferring data on the dedicated physical port have completed.

12. The method of claim 10, further comprising:
prior to powering off the one or more dedicated ports, sending, by the network management system, a notification to the storage management system, wherein the notification informs the storage management device the one or more dedicated ports will be powered off.

13. The method of claim 9, wherein generating configuration data to program one or more managed network devices to service the storage data transfer operation further comprises:
generating, by the network management system, configuration data to create a logical port on each physical port in the physical path of the switch fabric;
generating, by the network management system, configuration data to create a class of service setting on the logical port; and
generating, by the network management system, configuration data to create a virtual local area network service on the logical port, wherein the virtual local area network service transfers data through the physical path from the source storage device to the destination storage device.

14. The method of claim 13, wherein generating configuration data that creates a class of service setting on the logical port further comprises:

generating the class of service setting based on the message that defines the storage data transfer operation within the storage network controlled by the storage management system.

15. The method of claim 13, wherein generating configuration data that creates a class of service setting on the logical port further comprises:
generating the class of service setting based a type of customer associated with the storage data transfer operation.

16. The method of claim 1, wherein the network in the switch fabric to service the storage data transfer operation of the storage network comprises a logical network including one or more interconnected logical ports of one or more managed network devices, a class of service setting, and a virtual local area network service.

17. The method of claim 1, wherein the storage network further comprises one or more Network Attached Storage devices interconnected via an Ethernet protocol.

18. The method of claim 1, wherein the storage network further comprises one or more Storage Area Network devices interconnected via an Ethernet protocol, wherein the storage data transfer operation is executed using an Internet Small Computer System Interface.

19. The method of claim 1, wherein the storage network further comprises one or more storage devices connected via a Fibre Channel over Ethernet protocol.

20. The method of claim 1, wherein the switch fabric further comprises a virtual private local area network service, wherein the virtual private local area network service provides the network management system with a description of a physical topology of the switch fabric.

21. A network management system comprising:
a storage data transfer operation module configured to receive, from a storage management system of a data center, a message that defines a storage data transfer operation within a storage network controlled by the storage management system;
a device manager configured to generate configuration data to program one or more managed network devices to service the storage data transfer operation, wherein the one or more managed network devices are interconnected to form a switch fabric of the data center; and
one or more physical network interfaces to send the configuration data to the one or more managed network devices to create a network in the switch fabric to service the storage data transfer operation of the storage network.

22. The network management system of claim 21 further comprising:
a storage data transfer operation database configured to store the message that defines a storage data transfer operation within a storage network controlled by the storage management system; and
a management information base configured to store the configuration data sent to the one or more managed network devices to create a network in the switch fabric to service the storage data transfer operation of the storage network.

23. The network management system of claim 21, wherein the storage network further comprises one or more storage devices connected to the switch fabric, wherein the one or more storage devices receive one or more storage messages from the storage management service to execute the storage data transfer operation.

24. The network management system of claim 21, wherein the message that defines the storage data transfer operation further comprises a storage data transfer policy.

25. The network management system of claim 21, wherein the storage data transfer operation further comprises a periodic backup, wherein the periodic backup transfers data from a source storage device of the storage network to a destination storage device of the storage network at a pre-defined time interval or upon the occurrence of a pre-defined event.

26. The network management system of claim 25, wherein the programmable processor is further configured to:
send, by the network management system, a registration to the storage management system, wherein the storage management system uses the registration to notify the network management system that the storage data transfer operation has completed; and
receive, by the network management system, a notification from the storage management system, wherein the notification informs the network management system that the storage data transfer operation has completed.

27. The network management system of claim 21, wherein the storage data transfer operation further comprises a synchronous backup, wherein the synchronous backup transfers data from a source storage device of the storage network to a destination storage device of the storage network immediately after data on the source storage device has changed.

28. The network management system of claim 21, wherein the one or more managed network devices comprise a switch, router, bridge, or other network device capable of transmitting network packets.

29. The network management system of claim 21, wherein the programmable processor configured to receive the message that defines the storage data transfer operation within a storage network controlled by the storage management system is further configured to:
send, by the network management system, a request to the storage management server for the message that defines the storage data transfer operation within the storage network controlled by the storage management system.

30. The network management system of claim 21, wherein the programmable processor is further configured to:
identify, by the network management system, a source address of a source storage device of the storage network and a destination address of a destination storage device of the storage network based on the message that defines the storage data transfer operation within the storage network controlled by the storage management system; and
identify, by the network management system, a physical path, wherein the physical path comprises one or more interconnected physical ports of the one or more of managed network devices, wherein the physical path is capable of transferring data from the source storage device to the destination storage device via a network connection.

31. The network management system of claim 28, wherein the programmable processor is further configured to:
identify, by the network management system, one or more dedicated physical ports, wherein the one or more dedicated physical ports comprise a subset of the one or more physical ports of the one or more of managed network devices, wherein the one or more dedicated physical ports only transfer data of the storage data transfer operation;

prior to executing the storage data transfer operation, generate, by the network management system, configuration data to power on the one or more dedicated physical ports; and after execution of the storage data transfer operation has completed, generate, by the network management system, configuration data to power off the one or more dedicated physical ports.

32. The network management system of claim 31, wherein the programmable processor is further configured to:

determine, by the network management system, more than one periodic backups are executing concurrently, wherein at least two of the more than one periodic backups transfer data on a dedicated physical port; and power off the dedicated physical port only after each of the more than one periodic backups transferring data on the dedicated physical port have completed.

33. The network management system of claim 31, wherein the programmable processor is further configured to:

prior to powering off the one or more dedicated ports, send, by the network management system, a notification to the storage management system, wherein the notification informs the storage management device the one or more dedicated ports will be powered off.

34. The network management system of claim 30, wherein the programmable processor configured to generate configuration data to program one or more managed network devices to service the storage data transfer operation is further configured to:

generate, by the network management system, configuration data to create a logical port on each physical port in the physical path of the switch fabric;

generate, by the network management system, configuration data to create a class of service setting on the logical port; and generate, by the network management system, configuration data to create a virtual local area network service on the logical port, wherein the virtual local area network service transfers data through the physical path from the source storage device to the destination storage device.

35. The network management system of claim 34, wherein the programmable processor configured to generate configuration data that creates a class of service setting on the logical port is further configured to:

generate the class of service setting based on the message that defines the storage data transfer operation within the storage network controlled by the storage management system.

36. The network management system of claim 34, wherein the programmable processor configured to generate configuration data that creates a class of service setting on the logical port is further configured to:

generate the class of service setting based a type of customer associated with the storage data transfer operation.

37. The network management system of claim 21, wherein the network in the switch fabric to service the storage data transfer operation of the storage network comprises a logical network including one or more interconnected logical ports of one or more managed network devices, a class of service setting, and a virtual local area network service.

38. The network management system of claim 21, wherein the storage network further comprises one or more Network Attached Storage devices interconnected via an Ethernet protocol.

39. The network management system of claim 21, wherein the storage network further comprises one or more Storage Area Network devices interconnected via an Ethernet protocol, wherein the storage data transfer operation is executed using an Internet Small Computer System Interface.

40. The network management system of claim 21, wherein the storage network further comprises one or more storage devices connected via a Fibre Channel over Ethernet protocol.

41. The network management system of claim 21, wherein the switch fabric further comprises a virtual private local area network service, wherein the virtual private local area network service provides the network management system with a description of a physical topology of the switch fabric.

42. A method comprising:

generating, by a storage management system, a message that defines a storage data transfer operation within a storage network controlled by the storage management system; and sending, by the storage management system, the message that defines the storage data transfer operation to a network management system to generate configuration data to program one or more managed network devices to service the storage data transfer operation.

43. A storage management system comprising:

a storage data transfer operation module configured to generate a message that defines a storage data transfer operation within a storage network controlled by the storage management system; and one or more physical network interfaces to send the message that defines the storage data transfer operation to a network management system to generate configuration data to program one or more managed network devices to service the storage data transfer operation.

44. The storage management system of claim 43 further comprising:

a storage data transfer operation database configured to store the message that defines a storage data transfer operation within a storage network controlled by the storage management system.

45. A system comprising:

a network management system; and a storage management system;

wherein the network management system comprises a control unit comprising:

a storage data transfer operation module configured to receive, from the storage management system of a data center, a message that defines a storage data transfer operation within a storage network controlled by the storage management system;

a device manager configured to generate configuration data to program one or more managed network devices to service the storage data transfer operation, wherein the one or more managed network devices are interconnected to form a switch fabric of the data center; and one or more physical network interfaces to send the configuration data to the one or more managed network devices to create a network in the switch fabric to service the storage data transfer operation of the storage network.

* * * * *